UNITED STATES PATENT OFFICE.

NATHAN SULZBERGER, OF NEW YORK, N. Y.

LOCAL ANESTHETIC.

949,134.  Specification of Letters Patent.  Patented Feb. 15, 1910.

No Drawing.  Application filed October 15, 1909.  Serial No. 522,775.

*To all whom it may concern:*

Be it known that I, NATHAN SULZBERGER, a citizen of the United States, residing at Hotel Gotham, Fifty-fifth street and Fifth avenue, New York city, in the county of New York and State of New York, have invented a new and useful Composition of Matter Containing the Ester of an Organic Acid to be Used as a Local Anesthetic, of which the following is a specification.

It has been found that the esters of organic acids such as for instance ethyl acetate, phenyl stearate, etc., are ideal solvents for drugs having soothing and anesthetic action, such as for instance, menthol, cocain, etc., such solutions still possessing anesthetic action. It has furthermore been found that such solutions can be kept for very great lengths of time without deterioration—a decided advantage over solutions heretofore employed, especially for instance of cocain, which solutions heretofore employed lack keeping properties and decompose readily. Such decomposed solutions are not only very much less effective but also carry with them the danger of causing an infection, when applied.

As an example of one of these new preparations I cite the following: 10 parts by weight of cocain are dissolved in 90 parts of phenyl acetate. This new product forms a water white liquid of high analgesic and antiseptic properties, which latter are due to the high bactericidal value of the phenyl acetate, thereby adding to the analgesic value of cocain high antiseptic value, of which antiseptic properties cocain, when used alone, is almost entirely devoid. This ten per cent. solution of cocain in phenyl acetate has been experimentally kept upward of half a year without decomposition.

As a further example I cite a preparation of very high analgesic and antiseptic property, especially valuable in dentistry, prepared by dissolving 10 gr. of cocain in 50 gr. of phenyl acetate.

When such local anesthetics are dissolved in esters of fatty acids as such occur in animal and vegetable fats and oils, products of analgesic action of salve-like consistency are obtained.

To these mixtures may be added a very slight percentage of adrenalin which is much used in connection with cocain.

I claim:

1. A product of the nature disclosed to be used as a local anesthetic, consisting in a solution of about 10% of cocain in the phenol-ester of an organic acid.

2. A product of the nature disclosed to be used as a local anesthetic, consisting in a solution of cocain in phenyl acetate, having added thereto a very small percentage of adrenalin.

NATHAN SULZBERGER.

Witnesses:
 A. F. REIS,
 A. E. PETERSEN.